United States Patent [19]
Condon et al.

[11] Patent Number: 5,686,170
[45] Date of Patent: Nov. 11, 1997

[54] LABOR-SAVING PROCESS AND ARTICLE FOR MAKING DIMENSIONAL SIGN GRAPHICS

[75] Inventors: Robert R. Condon, Woodbury; Frank T. Sher, St. Paul, both of Minn.

[73] Assignee: Minnesota Mining And Manufacturing Company, St. Paul, Minn.

[21] Appl. No.: 576,644

[22] Filed: Dec. 21, 1995

[51] Int. Cl.⁶ .................................................. B32B 3/00
[52] U.S. Cl. .................. 428/207; 428/195; 428/213; 428/411.1; 428/480; 428/500; 428/522; 428/913
[58] Field of Search ..................... 156/228; 427/195; 428/411.1, 500, 501, 524, 913, 914, 207, 213, 480, 522, 195

[56] References Cited

U.S. PATENT DOCUMENTS

| | | |
|---|---|---|
| 2,621,432 | 12/1952 | Willner . |
| 3,061,881 | 11/1962 | Shemo . |
| 5,240,539 | 8/1993 | Gunzelman et al. ............. 156/248 |
| 5,246,757 | 9/1993 | Condon et al. .................... 428/40 |
| 5,346,571 | 9/1994 | Condon et al. .................... 156/212 |
| 5,389,413 | 2/1995 | Condon et al. .................... 428/40 |
| 5,399,217 | 3/1995 | Bloom ............................... 156/219 |
| 5,536,545 | 7/1996 | Condon et al. .................... 428/40 |

FOREIGN PATENT DOCUMENTS

| | | |
|---|---|---|
| 0 549 093 A | 6/1993 | European Pat. Off. . |
| 1205043 A | 9/1970 | United Kingdom . |
| 2250369 A | 6/1992 | United Kingdom . |

OTHER PUBLICATIONS

Colorlinx™ brochure.

*Primary Examiner*—William Krynski
*Attorney, Agent, or Firm*—Gary L. Griswold; Walter N. Kirn; John H. Hornickel

[57] ABSTRACT

A sign having raised or recessed, three-dimensional graphics and a method of making the sign are disclosed. The sign is fabricated from a laminated, multi-layered blank having a substantially continuous face layer formed of a conformable, thermoplastic material; a substantially continuous middle layer formed of a colored film; and a substantially continuous profile layer formed of a profile film. In use, dimensional characters are cut into the blank through the profile and middle layers only. Unwanted material is weeded out from around the cut, dimensional characters, and the resulting blank is vacuum-thermoformed to cause the uncut face layer to conform to the dimensional characters. A background sheet of a color contrasting to the middle sheet is then laminated to the back of the blank to form the completed sign.

16 Claims, 2 Drawing Sheets

LABOR-SAVING PROCESS AND ARTICLE FOR MAKING DIMENSIONAL SIGN GRAPHICS

TECHNICAL FIELD

This invention relates to three dimensional signage, and particularly to three dimensional signage having textural and decorative relief, as well as a method of making such signage.

BACKGROUND OF THE INVENTION

Current methods to produce three-dimensional (3-D) custom signs include industrially dedicated technologies such as sandblasting, acid-etching, routing, injection molding, photoemulsion, thermoforming, and vacuum molding processes. However, these processes each have a variety of limitations including large capital investment, a required high level of technical expertise, and expensive set-up for individual signs. Such processes are also limited in their ability to quickly and inexpensively vary design, color, fonts, etc. Some processes, such as acid-etching, injection molding, and vacuum forming require wet chemical processing, molten material processing or very high processing temperatures. Furthermore, process limitations, such as time-consuming and costly tooling and critical registration techniques for font and layout design (particularly in injection molding and vacuum forming methods), require mass produced sign quantities to be economically feasible. The result is a severely restricted design choice (color, font, layout, texture, etc.) for the graphic designer.

Other processes that provide some degree of custom color selection typically can require critical registration techniques, or the application of abradable or chippable color layers to the sign face. Many of these processes preclude integration of formed Braille dots as a visually appealing part of the sign face.

In vacuum thermoforming processes, both male and female molds are used in the industry. These molds are usually reused for multiple copies. The molds do not become part of the finished sign. While backfilling of the hollow characters with a foam or other liquid resin is possible, most thermoformed signs are backlit and retain hollow characters.

Some processes use a protective overlay film around applied raised graphic characters with minimal air entrapment. While offering the latitude of electronic-cut font generation capabilities, there are limitations in the capabilities of such processing methods to address the visual quality of the cut raised letters, color design selection, hardness, and handling durability.

At present, there does not exist an entirely satisfactory means for providing three-dimensional signs in limited quantities or employing custom designs having a wide latitude of design as compared to flat signage constructions.

Furthermore, the Federal Government has recently adopted the Americans with Disabilities Act (ADA) that requires architectural signage in all buildings and places accessible by the public to contain letters, numerals, and Braille characters that are raised off the surface of the sign. The Act specifies that the characters must be raised at least 0.031 inches (0.813 mm) above their supporting surface, so as to be easily distinguished, even by touch, by a disabled person. In addition to complying with the new legislation, the sign should also look aesthetically pleasing and be durable under heavy use conditions.

U.S. Pat. Nos. 5,246,757; 5,346,571; and 5,389,413; as well as pending application U.S. Ser. No. 08/213,181 (each assigned to Minnesota Mining and Manufacturing Company, St. Paul, Minn.) the teachings of which are incorporated herein by reference, each describe methods for making signs having raised graphics as well as the signs resulting from such methods. Although such signs are durable and offer excellent visibility and aesthetics, the methods used to produce such signs are complex. Accordingly, such methods may not be well-suited for use in small sign shops or sign shops contained within another facility such as a hospital or other public building.

SUMMARY OF THE INVENTION

In view of the above, a need exists for methods for producing signs which are durable, compliant with the Americans with Disabilities Act, and which may be fabricated using a minimum number of processing steps and materials.

The present invention relates to a method for making signs having raised or recessed graphics, as well as a sign blank for use therewith. More particularly, the present invention relates to a three-layered blank having a face layer formed of a clear or translucent thermoplastic film, a middle layer formed of a colored film, and a profile layer formed of a relatively thick profile film. Each of the layers is substantially continuous, with the layers being bonded together using an adhesive such as a pressure sensitive adhesive (PSA). At least the PSA between the colored film and the clear or translucent thermoplastic film is a transparent PSA to thereby allow the colored film to be visible through the thermoplastic film.

The blank is used to form a sign by a method which includes the steps of a) cutting a reverse of the intended sign graphics into the blank in a manner such that the profile film and the colored film are cut, while leaving the clear thermoplastic film scored, yet substantially uncut and intact, b) weeding portions of the profile film and the colored film from the blank in a manner such that all portions except the intended sign graphics are removed, c) thermally forming the sign such that the clear thermoplastic layer is caused to conform around the profile and colored film portions remaining after the weeding step, and d) applying an appropriate background color to the back of the sign, such as by laminating or painting. The resulting sign may be optionally embossed with Braille or other tactile characters, and then affixed to a suitable surface.

In one embodiment, a carrier sheet having a release layer may be affixed to the back of the sign using a PSA. Upon removal of the carrier sheet, the sign may be affixed to any suitable surface or sign base. Alternatively, hook-and-loop fasteners, or other fastening systems may be used to apply the sign to a surface.

DESCRIPTION OF THE PREFERRED EMBODIMENTS

Conventional Methods:

Conventional methods for forming signs having raised or recessed, 3-dimensional graphics involve numerous process steps. For example, previously incorporated U.S. patent application Ser. No. 08/213,181 involves an eleven-step process which comprises:

1) Laminating a profile film to a color film having a release layer on the side opposite that to which the profile film is laminated;
2) Cutting the laminate, using a computer-aided design and manufacturing (CAD/CAM) knife cutter to cut dimensional alphanumeric and pictorial characters in reverse through the top profile film layer and the color layer, while leaving the release layer of the color film slightly scored;
3) Weeding out (i.e., removing) the laminate around the dimensional characters;
4) Applying a prespace tape over the dimensional characters;
5) Removing the release layer from the prespaced dimensional characters;
6) Laminating the prespaced dimensional characters to the underside of a clear thermoplastic top film;
7) Removing the prespace tape;
8) Thermally forming the sign on a vacuum stage to cause the top film to deform and conform to the shape of the laminated dimensional characters;
9) Laminating a colored background film of a color contrasting with the earlier color film to the back of the sign;
10) Optionally embossing Braille characters into the sign; and
11) Mounting the sign on a sign base such as an acrylic or polycarbonate with a laminating PSA.

As should be apparent, the method described above can be complex and time consuming, and requires many processing steps in which an error could reduce the quality and value of the completed sign. In contrast, in the inventive method described below, at least four process steps are eliminated, thereby rendering a simpler process having a substantially reduced likelihood for error during fabrication of the sign.

Figure 1:
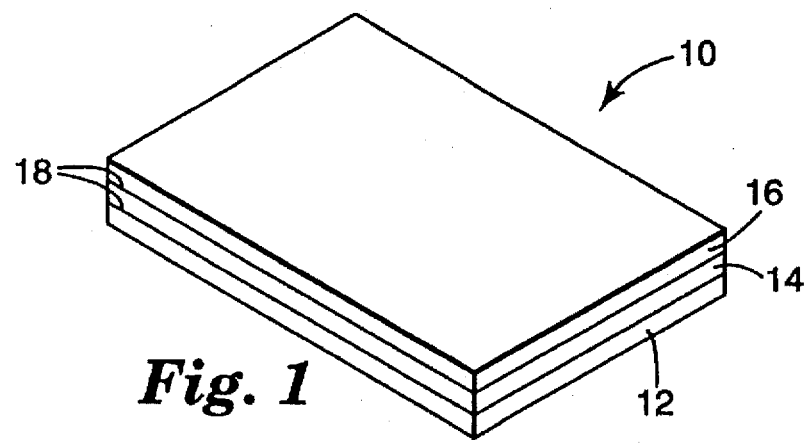
FIG. 1 is a schematic representation of a sign blank for use with the method of the invention.
Figure 2:
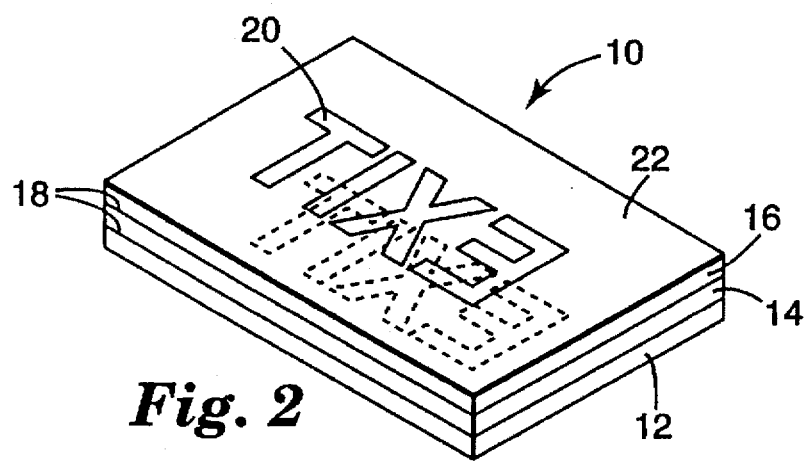
FIG. 2 is a schematic representation of a sign blank that has had dimensional characters cut partly therethrough.
Figure 3:
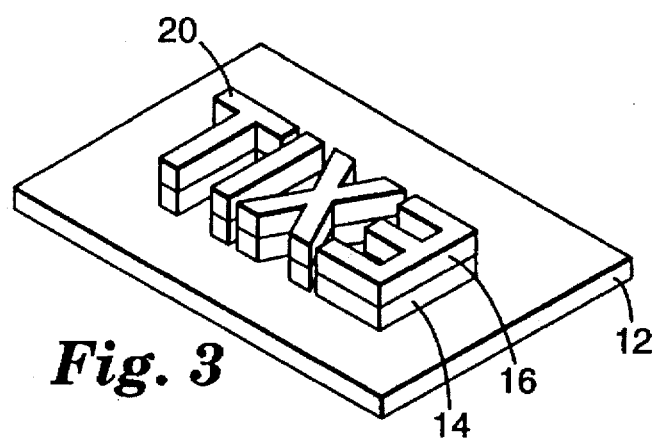
FIG. 3 is a schematic representation of a sign blank that has been weeded to remove unwanted portions thereof.
Figure 4:
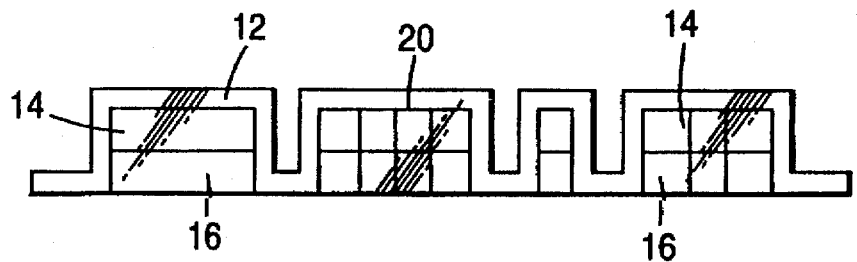
FIG. 4 is a schematic representation of the sign blank of FIG. 3 that has been vacuum-thermoformed to create a sign face having a raised profile.
Figure 5:
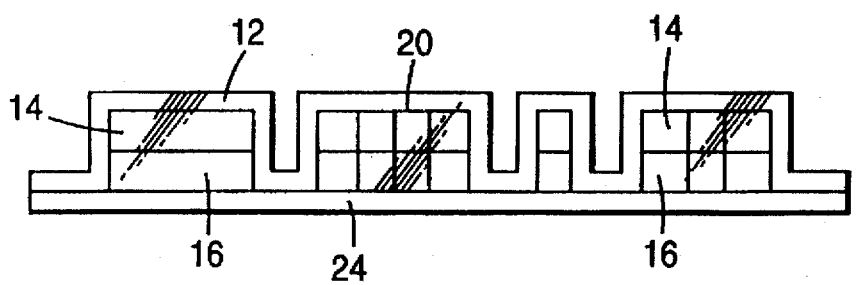
FIG. 5 is a schematic representation of a sign face having a background film laminated thereto to form a completed sign.
Figure 6:
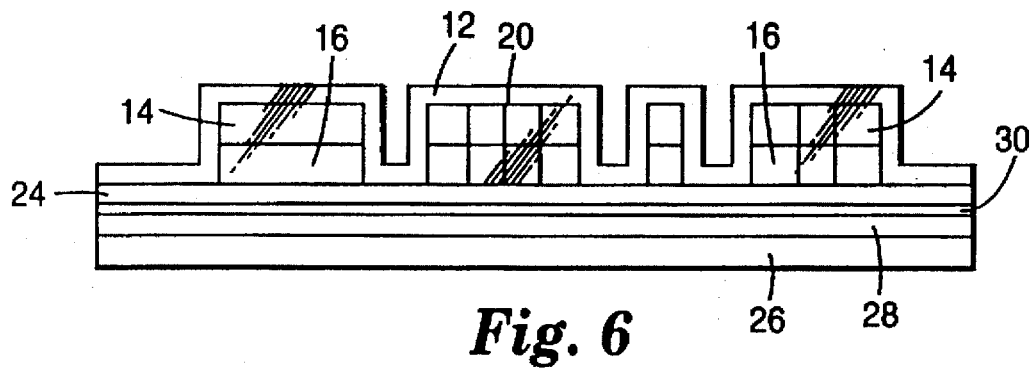
FIG. 6 is a schematic representation of a sign which includes a pressure sensitive adhesive, and a carrier with a release layer.

Method:

The method of the present invention is best understood with reference to the Figures. Additionally, as will be described in detail below, the inventive method makes use of a novel article which serves as a blank during fabrication of the sign. The method for fabricating signs in accordance with the present invention is carried out as follows:

1) A blank 10 which comprises a three-layered laminate is provided. The blank comprises a clear thermoplastic face layer 12, a colored middle layer 14, and a profile film layer 16. In one embodiment, each of the layers are bonded together using a PSA 18. At least the PSA 18 between the face 12 and middle 14 layers is transparent to allow the color of the middle layer to be visualized through the face layer. (FIG. 1)
2) The blank 10 is cut using a CAD/CAM knife cutter to cut dimensional alphanumeric and/or pictorial characters 20 in reverse, (i. e., mirror-image), through the profile film layer 16 and the color layer 14, while leaving the clear thermoplastic (face) layer 12 intact and substantially uncut. (FIG. 2)
3) The cut laminate (i.e., the profile film 16 and color film 14 layers) is weeded out around the dimensional characters 20 to remove waste material 22 and leave only the characters 20 laminated to the thermoplastic face 12. (FIG. 3) The resulting assembly is referred to herein as a "cut blank" or "sign intermediate".
4) The cut blank is then inverted and the sign is thermally formed on a vacuum stage to cause the face layer 12 to soften and conform to the shape of the laminate characters 20. (FIG. 4)
5) A color is applied to the back of the sign, preferably by painting or laminating a colored background film 24 of a color contrasting with the earlier color film 14. (FIG. 5)
6) Braille characters are optionally embossed into the sign; and
7) The sign is optionally mounted on a carrier sheet 26 having a release layer 28 and a PSA 30. (FIG. 6)

Figure 7:
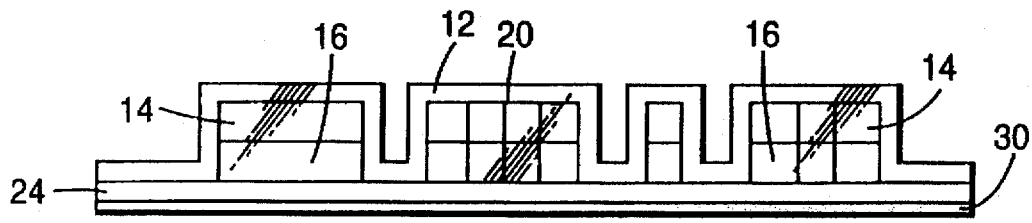
FIG. 7 is a schematic representation of the sign of FIG. 6 with the carrier and release layer removed.

For mounting the sign, the carrier sheet 26 and release layer 28 can be removed while leaving the PSA on the sign back (FIG. 7) and the sign can be adhered, via the PSA, to a surface, such as a wall or sign base, to allow it to be viewed. As an alternative, hook-and-loop fasteners, or other such systems, may be used to affix the sign to a sign base or other appropriate surface.

The process described above can overcome many of the limitations of systems known in the art. The inventive method and article are believed to be the first which offer, in combination, each of the following improvements and advantages: a) font variety afforded by electronic cutters, b) capability of fine definition, high quality small font sizes (for room signs, etc.); c) excellent visual quality of characters, d) textured background capabilities, e) simple, low cost processing equipment, f) safer, lower processing temperatures that allow improved gloss control, g) very fast processing times, h) excellent conformability around 3-D characters with minimal air entrapment, i) excellent durability and weatherability, j) integrated Braille capabilities and Braille dots with desirable tactile qualities, and k) capabilities to meet ADA requirements. Additionally, the process and article allow numerous custom layout capabilities including enhanced contrast between the characters and the background. Such contrast effects include large color selection and color consistency, reflectivity, translucency, metallic effects, pattern effects including marbling and wood grain, and different tactile contrasts of 3-D characters. In an alternative embodiment, the cut characters can be removed from the sign blank. In that embodiment, the vacuum forming of the face layer affords recessed characters on the sign.

In the vacuum conforming step, the cut blank, with unwanted material weeded out, is placed with the profile film layer facing down on a vacuum table. While a vacuum is applied to the laminate, the thermoplastic face layer (facing up) is heated using, for example, a heat gun. Although it is possible to thermally conform a sign face using only about 1–5 inches Hg of vacuum, it is generally preferred to use a vacuum of at least about 10 inches Hg. A temperature of about 121° C. (250° F.) is found to provide satisfactory results. Temperatures above about 177° C. (350° F.) tend to degrade the integrity and appearance of the layers. Of course, this is dependent upon the actual material selected. The combination of the heat and the vacuum cause the thermoplastic face layer 12 to conform about the characters 20. Generally, processing time is dependent upon numerous factors, including the size of the sign, the face temperature, the vacuum pressure, the thermoplastic material, and the thickness of the thermoplastic layer.

Although the processing time is not set for a specific sign size due to various factors, processing times are found to be much faster as compared to other sign fabrication processes.

In another embodiment, the sign may be preheated in a frame under heating elements until the top thermoplastic layer softens. The sign is then lowered quickly onto a vacuum table, whereupon a vacuum is immediately drawn using a vacuum surge tank to cause the top layer to conform about the profile characters.

Materials:

As noted above, the inventive method is carried out using a novel, three-layered blank having a clear, thermoplastic face layer 12, a middle color layer 14, and a profile film layer 16. Each of the layers is laminated together using a pressure sensitive adhesive 18. Each of the layers used in the blank is substantially continuous. As used herein, the term "substantially continuous" is intended to mean that the material extends over an area approximating that of the ultimate, completed sign, and is free of voids, interruptions, cracks, apertures, or other such discontinuities. Thus, for example, if the completed sign is to have dimensions of approximately 12 inches (30.5 cm) by 24 inches (61.0 cm), then each of the face, middle, and profile layers, as used in the blank, will have similar, if not identical, dimensions.

In one preferred embodiment, the clear thermoplastic layer 12 is a thermoplastic sheeting having a thickness in the range of about 0.001–0.025 inches (0.03–0.64 mm), preferably about 0.010–0.020 inches (0.25–0.51 mm). The material is rigid or semi-rigid at ambient temperatures in the environment in which the sign will be used, yet becomes conformable at elevated temperatures. The conformability of the material allows it to be molded over the 3-dimensional characters of the sign. As used herein, the term conformable is intended to mean that the thermoplastic may be reshaped at elevated temperatures, such as temperatures of about 200° F. (~93° C.) and above. The thermoplastic provides a rigid and unitized construction of the entire face of the sign. Although a flexible material may be used in some applications, the sign face would not be as durable, nor would it retain Braille or other formed textures as well.

Layer 12 is preferably transparent in order to allow visualization of contrasting color layers, however, it could itself also be colored. Gloss control of layer 12 may also be provided by way of fillers, surface texture, coatings or the like. To achieve the preferred level of durability, the thermoplastic preferably has a Shore D hardness greater than about 50, preferably greater than about 65, or a Shore C hardness greater than about 75, preferably greater than about 85. Thermoplastics that soften and become conformable below about 149° C. (300° F.) provide visually acceptable signs and offer excellent conformation to 3-D characters using moderate processing temperatures (about 121° C., 250° F.). Examples of such materials include, but are not limited to, modified polyesters, polyvinyl chlorides, cellulose acetate butyrates, polystyrenes and the like.

The middle, color layer 14 is preferably a conformable film material having a thickness in the range of about 0.001–0.005 inches (0.03–0.13 mm), having a substantially transparent PSA layer on its upper surface. The PSA layer is used to laminate the color layer 14 to the clear, thermoplastic face layer 12. The color layer must also be cuttable using a CAD/CAM knife cutter. The material should not deteriorate at processing temperatures. Suitable film materials include, but are not limited to, vinyl chloride-containing polymers. In one preferred embodiment, the middle color layer is formed of a SCOTCHCAL™ Series 7725 film manufactured by Minnesota Mining and Manufacturing Company (St. Paul, Minn.) hereinafter referred to as "3M".

Alternatively, a separate color layer need not be used to provide a contrast between the characters and the background. Rather, the contrasting color can be provided by a colored PSA applied to the surface of the profile characters that contacts the face material, or the color could be that of the profile film itself. In yet another embodiment, the color could be provided by a layer of a colored medium such as a paint, dye, pigment, ink or the like, applied to either the surface of the profile film which faces the thermoplastic layer, or the surface of the thermoplastic layer which faces the profile film. In this latter case, as in the case of a colored PSA, the color must be removeable from the thermoplastic layer during the profile film weeding step described above.

The profile film layer 16 is preferably a PSA-backed film material having a thickness in the range of about 0.010–0.050 inches (0.25–1.27 mm). The material must be able to withstand sign processing temperatures and conditions without structural degradation. In general, the height of the 3-D characters should not exceed about 1.4 times the width of such characters, although this ratio is not intended to be limiting and will vary depending upon the thermoplastic material used. In the preferred embodiment, the color and appearance of the profile film layer 16 are not important because the middle color layer 14 overlies and hides the profile layer. Additionally, imperfections cut into the profile layer can usually be easily masked by the color 14 and thermoplastic face 12 layers conformed around it.

The profile film layer functions primarily as a "mold" to form characters in the thermoplastic face layer 12. Because the profile film characters remain in the completed sign, the profile film provides reinforcement, durability and strength to the sign. As such, the characters cannot readily be pushed in on themselves, collapsed or otherwise deformed. Suitable profile film materials include, but are not limited to filled rubber materials such as 3M SCOTCHCAL™ Series 7795 High Profile Film (0.032 inch thickness).

The background color layer 24 can be a colored or patterned conformable layer, and preferably is coated with a substantially transparent PSA to allow it to be visualized through the thermoplastic layer 12. Examples include, but are not limited to, 3M SCOTCHCAL™ Series 7725 and Series 3630 translucent films, 3M DINOC™ patterned films, and 3M SCOTCHPRINT™ design films. Alternatively, a background color may be provided by a wet applied ink, dye, paint, or paint film.

As noted above, carrier 26 and release 28 layers can be adhered to the back of the sign using an adhesive. Upon removal of layers 26 and 28, the adhesive remains on the back of the sign, allowing the sign to be adhered to a surface. The carrier and release layers are typically provided as an integral unit. For example, the carrier 26 may be a paper or polymeric film having a release layer formed by a silicone coating on one side. A suitable adhesive is provided on the silicone release layer. One example of a suitable carrier/release/adhesive construction is SCOTCHCAL™ Series 7790 laminating adhesive, available from 3M.

Suitable adhesives for use in the present invention typically have a 180° peel test strength of 1–6 lb/inch as described in ASTM D 3330-87 (Peel Adhesion of Pressure-Sensitive Tape at 180 Degrees Angle). As noted above, the preferred adhesives are pressure sensitive adhesives (PSAs). Such adhesives develop sufficient bonding power upon application of light pressure. In addition to PSAs, suitable adhesive systems include thermoplastic adhesives, crosslinking adhesive systems, and the like. Optionally, an adhesion enhancer or primer may be applied to one or both bonding surfaces to enhance adhesion.

EXAMPLE

A sign having raised white text was made as follows:
1) White SCOTCHCAL™ 220-10 film (2 mil plasticized vinyl with a layer of about 1 mil clear acrylic PSA) was laminated to the smoother side of a thermoplastic face layer which comprised SCOTCHCAL™ 7790 film (a clear 0.015 inch impact-modified poly(vinylchloride/vinylacetate) thermoplastic, available from 3M).
2) To the white vinyl film side was laminated SCOTCHCAL™ 7795 Profile Film (32 mil filled rubber with a layer of PSA). This three-part laminate constitutes the novel blank of the present invention.
3) The blank was placed onto a Zund P1200 flatbed cutter with the thermoplastic face layer against the table surface.
4) The knife pressure of the cutter was adjusted to allow alphanumeric characters to be cut through the profile film and SCOTCHCAL™ 220-10 film layers, but not through the face film. (At most, the face film was scored by the cutter).
5) After cutting, unwanted profile film and SCOTCHCAL™ 220-10 film were weeded off of the face film sheet using a knife blade and tweezers.

The resulting construction was then processed into a sign using conventional thermoforming and background film laminating procedures as described above.

Equivalents

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows.

What is claimed is:

1. A multi-layered sign blank which comprises:
   a) a substantially continuous face layer formed of a conformable, thermoplastic material;
   b) a substantially continuous middle layer formed of a colored film; and
   c) a substantially continuous profile layer formed of a profile film; wherein each of the face, middle and profile layers are contiguously laminated together into a substantially continuous sheet,
   wherein the profile film has a thickness in the range of about 0.25–1.27 mm and is able to withstand sign processing temperatures and conditions without structural degradation.

2. The multi-layered sign blank of claim 1, wherein the conformable thermoplastic material is substantially clear.

3. The multi-layered sign blank of claim 1, wherein the conformable thermoplastic material is selected from the group consisting of modified polyesters, polyvinyl chlorides, cellulose acetate butyrates, polystyrenes and copolymers thereof.

4. The multi-layered sign blank of claim 1, wherein the conformable thermoplastic material has a thickness in the range of about 0.03–0.64 mm.

5. The multi-layered sign blank of claim 4, wherein the conformable thermoplastic material has a thickness in the range of about 0.25–0.51 mm.

6. The multi-layered sign blank of claim 1, wherein the middle layer comprises a vinyl chloride-containing polymer.

7. The multi-layered sign blank of claim 1, wherein the middle layer has a thickness in the range of about 0.03–0.13 mm.

8. The multi-layered sign blank of claim 1, wherein the profile film comprises a filled rubber.

9. The multi-layered sign blank of claim 1, wherein at least one of the layers is laminated to at least one of the other layers using a pressure sensitive adhesive.

10. The multi-layered sign blank of claim 9, wherein the middle layer is laminated to the face layer using a clear, pressure sensitive adhesive.

11. The multi-layered sign blank of claim 1, which further includes cuts to define dimensional characters, the cuts passing through the profile film and the colored film while leaving the face layer intact.

12. A multi-layered sign blank which comprises:
   a) a substantially continuous face layer formed of a conformable, thermoplastic material; and
   b) a substantially continuous profile layer formed of a profile film; wherein each of the face and profile layers are contiguously laminated together into a substantially continuous sheet,
   wherein the profile film has a thickness in the range of about 0.25–1.27 mm and is able to withstand sign processing temperatures and conditions without structural degradation.

13. A sign intermediate which comprises the multi-layered sign blank of claim 12, wherein the profile film has been cut to provide at least one profile segment in the form of a dimensional character; each such segment being affixed to a surface of the conformable, thermoplastic material.

14. A sign having a three-dimensional profile which comprises the sign intermediate of claim 13 wherein the thermoplastic material is conformably affixed to each dimensional character.

15. The sign of claim 14 which further includes a background sheet, wherein the background sheet is of a color contrasting with a color of the dimensional character when such character is viewed through the thermoplastic material.

16. The sign of claim 15 wherein background sheet is laminated to the thermoplastic material in a manner which encapsulates each dimensional character between the background sheet and the thermoplastic material.

* * * * *